(12) United States Patent
Hsu et al.

(10) Patent No.: US 7,173,388 B1
(45) Date of Patent: Feb. 6, 2007

(54) DRIVE CONTROL DEVICE FOR BRUSHLESS MOTOR

(75) Inventors: Wen Faung Hsu, Pan-Chiao (TW); Paul Wang, Dong Guan (CN); Jonathan Liu, Dong Guan (CN)

(73) Assignee: Power Logic Tech. Inc., Taipei (TW)

( * ) Notice: Subject to any disclaimer, the term of this patent is extended or adjusted under 35 U.S.C. 154(b) by 0 days.

(21) Appl. No.: 11/271,875

(22) Filed: Nov. 14, 2005

(51) Int. Cl.
*H02K 17/32* (2006.01)

(52) U.S. Cl. .................. 318/434; 318/439; 318/138; 318/254

(58) Field of Classification Search ............ 318/434, 318/254, 138, 439
See application file for complete search history.

(56) References Cited

U.S. PATENT DOCUMENTS

| 6,414,408 B1 * | 7/2002 | Erdman et al. ............ 310/68 R |
| 2006/0087789 A1 * | 4/2006 | Norell et al. ............... 361/103 |

* cited by examiner

*Primary Examiner*—Rita Leykin

(57) ABSTRACT

A drive control device for a brushless motor includes a full-wave rectifying-filtering circuit, a voltage regulating circuit, a drive control circuit and a protection circuit. A combination of the rectifying-filtering and voltage regulating circuit provides both the motor coil and the drive control circuit capable of operating at a normal working status to ensure the brushless motor with safe and reliable operation. Therefore, the brushless motor does not need a bulk and complex transformer for voltage drop, which may reduce the reliability of the operation.

13 Claims, 3 Drawing Sheets

DRIVE CONTROL DEVICE FOR BRUSHLESS MOTOR

BACKGROUND OF THE INVENTION

1. Field of the Invention

The present invention relates to a drive control device for a brushless motor of a fan.

2. Related Art

The conventional brushless motor of the fan includes a transformer connected with a power source for voltage drop to output for rectifying and filtering to provide for a motor coil and a drive control circuit. However, the existing transformer increases cost, volume and complexity of the motor due to its weight, bulk body and working requirement and reduces reliability and stability of the motor due to heat generation. Moreover, the brushless motor utilizes a current limit protection to keep a working current below a limited value when a supply current is higher than the limited value. However, the motor circuit does not break off and the motor coil is continuously working. As such, the motor coil is easy to overheat or burn out under the high loading situation in a long run.

SUMMARY OF THE INVENTION

The present invention is to provide a reliable and stable drive control device for a brushless motor.

The drive control device of the present invention can ensure the motor coil of the brushless motor works in a safe and reliable situation for a long run.

Accordingly, the drive control device for the brushless motor of the present invention comprises a rectifying circuit with an input connected to a power source and an output connected to one terminal of each of a first and a second inductors of the brushless motor, a regulating circuit with an input connected to the output of the rectifying circuit, a drive control circuit with an input connected to an output of the regulating circuit and an output connected to the other terminal of each of the first and the second inductor, and a protection circuit connected between the output of the rectifying circuit and ground. The rectifying circuit includes a bridge rectifier with four diodes bridging in parallel and a capacitor filter with a capacitor. The regulating circuit includes two resistors and a regulator tube. The resistors are connected between the output of the rectifying circuit and the ground in series, and the regulator tube is connected between a junction of two resistors and the ground in series. The drive control circuit includes a first and a second integrated chips, a first and a second complementary metal oxide semiconductors (CMOS), a first, a second, a third, a fourth, a fifth and a sixth resistors and a first, a second and a third capacitors. The first resistor has one terminal connected to the output of the rectifying circuit and the other terminal connected to a first pin of the first integrated chip. The second resistor is connected between a third pin of the first integrated chip and the ground in series. The first integrated chip has a second and a fourth pins connected to two input pins of the second integrated chip, respectively. The second integrated chip has a Vcc pin connected to the output of the regulating circuit and a GND pin directly connected to the ground. The first capacitor is connected between a CT pin of the second integrated chip and the ground in series. The fourth resistor is connected between the first output pin of the second integrated chip and a gate of the first CMOS in series. The fifth resistor and the second capacitor connected in parallel are connected between the gate of the first CMOS and ground in series. A drain of the first CMOS is connected to the other terminal of the first inductor, and a source of the first CMOS is connected to the ground. The third resistor is connected between the second output pin of the second integrated chip and a gate of the second CMOS in series. The sixth resistor and the first capacitor connected in parallel are connected between the gate of the second CMOS and the ground in series. A drain of the second CMOS is connected to the other terminal of the second inductor, and a source of the second CMOS is connected to the ground. The protection circuit includes a regulator tube connected between the output of the rectifying circuit and the ground.

Furthermore, the drive control device comprises a current limit circuit including a first and a second diodes, a triode, a seventh, a eighth and a ninth resistors and a capacitor. The first and the second diode are connected between the first and the second output pin of the second integrated chip and a collector of the triode in series, respectively. An emitter of the triode is connected to the ground. A base of the triode connected with the seventh resistor in series is connected to each source of the first CMOS and the second CMOS. The eighth resistor connected with the capacitor in parallel is connected between the base of the triode and the ground. The ninth resistor is connected between each source of the first CMOS and the second CMOS and ground in series.

Furthermore, the drive control device comprises a voltage limit circuit including a CMOS, a triode, a regulator tube and a first, a second and a third resistors. A drain and a source of the CMOS are connected to the output of the rectifying circuit and each of the first and the second inductors in series, respectively. A gate of the CMOS connected with the third resistor in series is connected to a collector of the triode. The first resistor is connected between the drain and the gate the CMOS in parallel. An emitter of the triode is connected to the ground. A base of the triode connected with the regulator tube and the second resistor in series is connected the source terminal of the CMOS.

Using a combination of the rectifying and regulating circuit provides both the motor coil and the drive control circuit capable of operating at a normal working status to ensure the brushless motor with safe and reliable operation. Therefore, the brushless motor does not need a bulk and complex transformer for voltage drop, which may reduce the reliability of the operation. By two diodes and a triode forming the current limit circuit, when the current over a limit, the motor coil will stop under the control of triode. As such, it can prevent the motor coil from overheating or burning out under the high loading situation in a long run.

Other objects, advantages and novel features of the present invention will be drawn from the following detailed embodiments of the present invention with attached drawings, in which:

DESCRIPTION OF THE PREFERRED EMBODIMENTS

Figure 1:
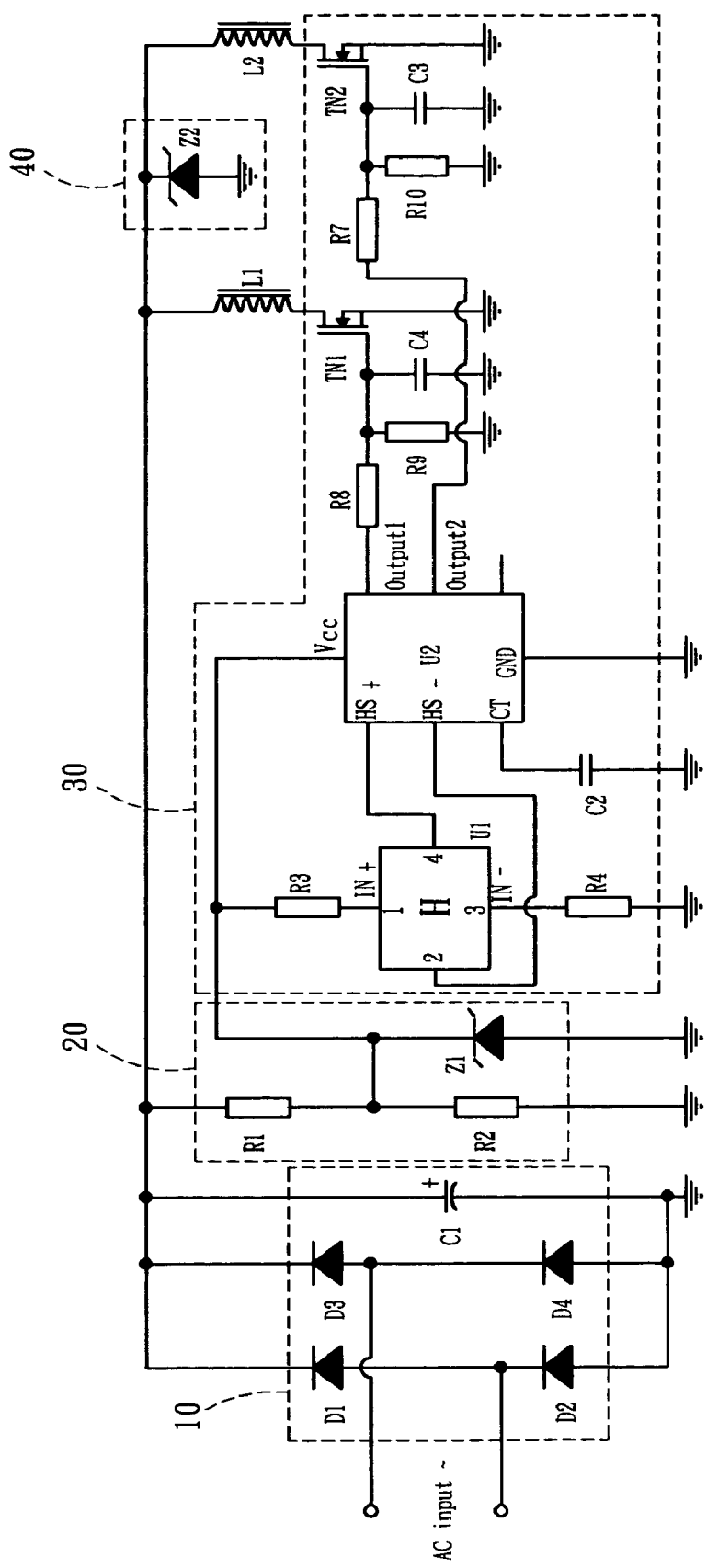
FIG. 1 is a circuit diagram of a drive control device for a brushless motor according to a first preferred embodiment of the present invention.

Referring to FIG. 1, a drive control device for a brushless motor of the present invention includes a full-wave rectifying-filtering circuit 10, a voltage regulating circuit 20, a drive control circuit 30 and a protection circuit 40.

The rectifying-filtering circuit 10 has the input connected to a power source and the output connected to the input of the regulating circuit 20 and one terminal of each inductor L1, L2 of the motor. The output of the regulating circuit 20 is connected to the input of the drive control circuit 30 so that a steady working voltage can be obtained. The output of the drive control circuit is connected to the other terminal of each inductor L1, L2. The protection circuit is connected between the output of the rectifying-filtering circuit 10 and ground.

The full-wave rectifying-filter circuit 10 includes a bridge rectifier with four diodes D1, D2, D3, D4 bridging in parallel and a capacitor filter with a capacitor C1. The diodes D1, D2, D3 D4 can be chosen from the group of 1N4001, 1N4005 and 1N4007 rectifier diodes.

The voltage regulating circuit 20 includes two resistors R1, R2 and a regulator tube Z1 chosen from the group of BZX85C18, BZX85C15 and 1N5931B regulator diodes. The resistors R1, R2 are connected between the output of the rectifying-filtering circuit 10 and ground in series. The regulator tube Z1 is connected between the junction of two resistors R1, R2 and ground in series.

The drive control circuit includes two integrated chips U1, U2, two complementary metal oxide semiconductors (CMOS) TN1, TN2, a plurality of resistors R3, R4, R7, R8, R9, R10 and a plurality of capacitors C2, C3, C4. The integrated chip U1 is chosen from the group of HW104A, SH12A and HW101 Hall sensors, and the integrated chip U2 is chosen from the group of BA6406, PT308F-B, and AP1307 drive integrated circuits (ICs). CMOS TN1, TN2 is chosen from the group of 2SK2996, RDX120N60 and RDX100N60 power MOSFETs (metal oxide semiconductor field effect transistors). The resistor R3 has one terminal connected to the output of the rectifying-filtering circuit 10 and the other terminal connected to a first pin (IN+) of the integrated chip U1 for providing the working voltage. The resistor R4 is connected between a third pin (IN−) of the integrated chip U1 and ground in series. Second and fourth pins of the integrated chip U1 are connected to two input pins HS(−) and HS(+) of the integrated chip U2, respectively. Vcc pin of the integrated chip U2 is connected to the output of the regulating circuit 20. The capacitor C2 is connected between CT pin of the integrated chip U2 and ground in series. GND pin of the integrated chip U2 is directly connected to ground. The resistor R8 is connected between the first output pin (Output 1) of the integrated chip U2 and the gate (G terminal) of CMOS TN1 in series. The resistor R9 and the capacitor C4 connected in parallel are connected between the G terminal of CMOS TN1 and ground in series. The drain (D terminal) of CMOS TN1 is connected to the other terminal of the inductor L1, and the source (S terminal) of CMOS TN1 is connected to ground. Similarly, the resistor R7 is connected between the second output pin (Output 2) of the integrated chip U2 and the G terminal of CMOS TN2 in series. The resistor RIO and the capacitor C3 connected in parallel are connected between the G terminal of CMOS TN2 and ground in series. The D terminal of CMOS TN2 is connected to the other terminal of the inductor L2, and the S terminal of CMOS TN2 is connected to ground.

The protection circuit includes a regulator tube Z2 connected between the output of the rectifying-filtering circuit 10 and ground. The regulator tube Z2 is chosen from the group of 1N5955B and 1N5956B regulator diodes.

Figure 2:
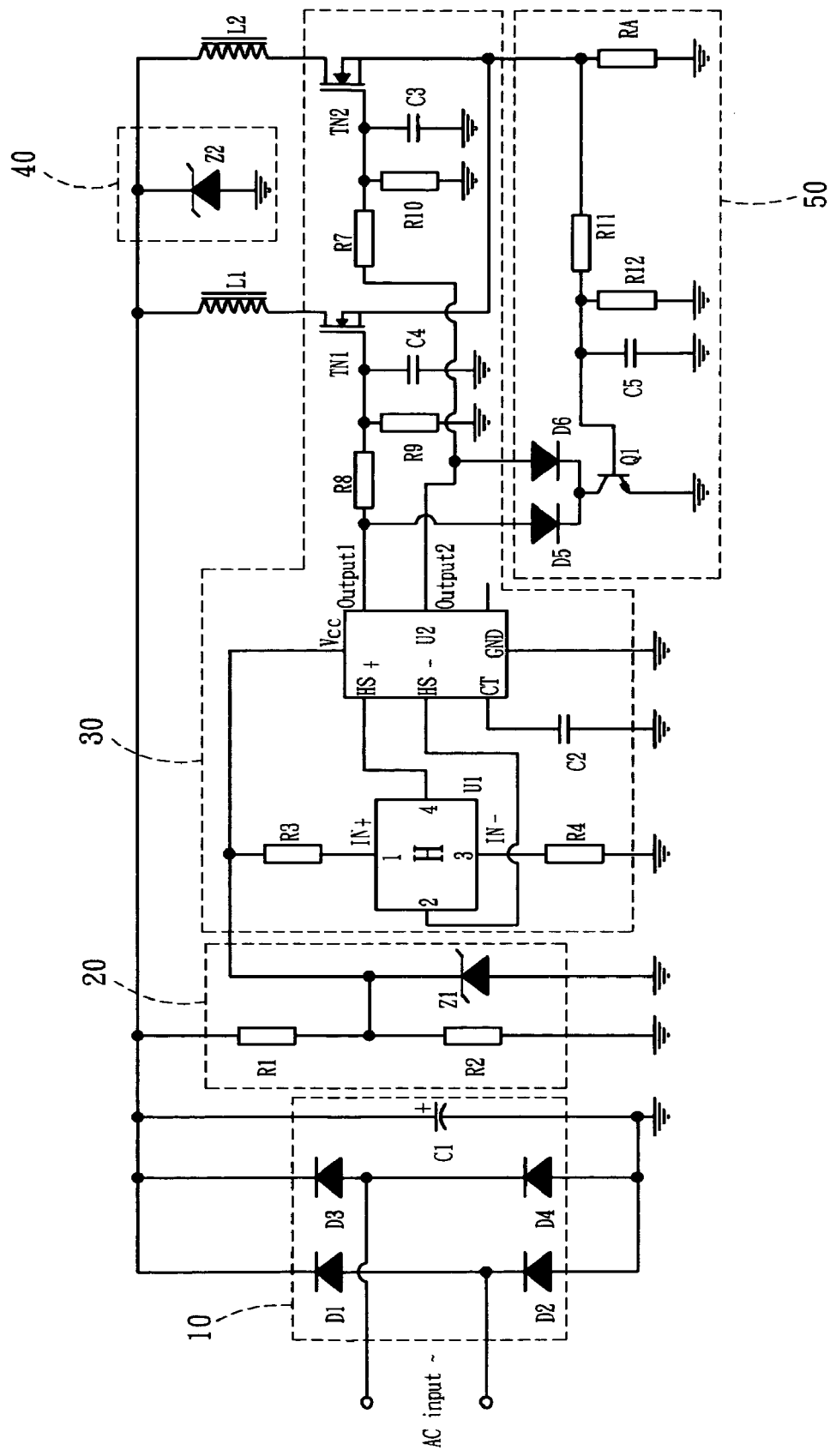
FIG. 2 is a circuit diagram of a drive control device for a brushless motor according to a second preferred embodiment of the present invention.

In order to ensure the motor coil works in a safe and reliable range, the drive control device of the present invention further includes a current limit circuit 50, as shown in FIG. 2. The current limit circuit 50 includes two diodes D5, D6, a triode Q1, a plurality of resistors R11, R12, RA and a capacitor C5. The diodes D5, D6 are chosen from the group of 1N4148, 1N4448 and RLS4148 regulator diodes. The triode Q1 is chosen from the group of UMT2222A, SST2222A and MMST2222A triodes. The diode D5 is connected between the Output 1 of the integrated chip U2 and the collector of the triode Q1 in series, and the diode D6 is connected between the Output 2 of the integrated chip U2 and the collector of the triode Q1 in series. The emitter of the triode Q1 is connected to ground. The base of the triode Q1 connected with the resistor R11 in series is connected to each S terminal of the CMOS TN1 and TN2. The resistor R12 connected with the capacitor C5 in parallel is connected between the base of the triode Q1 and ground. The resistor RA is connected between each S terminal of the CMOS TN1 and TN2 and ground in series.

Figure 3:
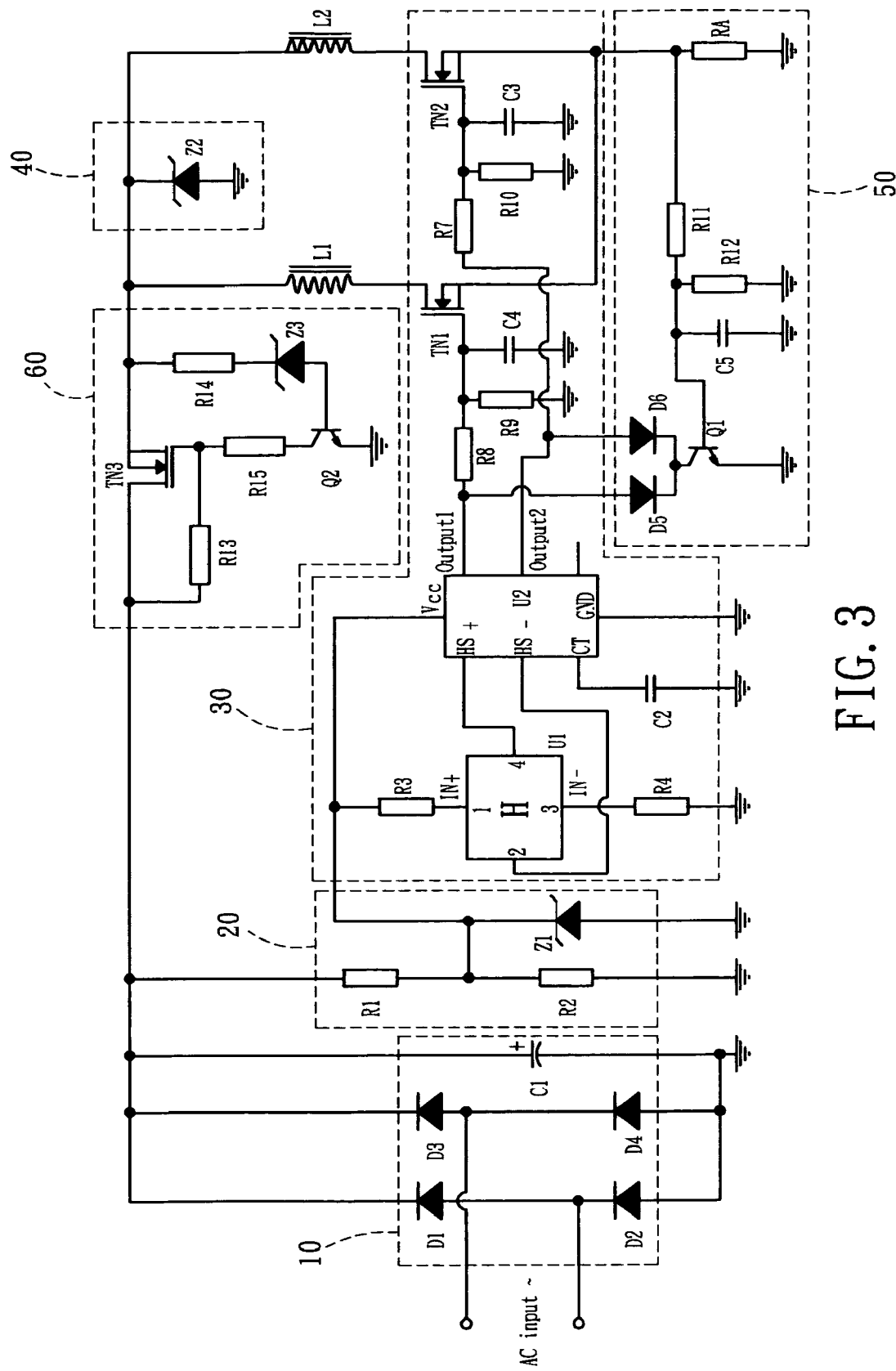
FIG. 3 is a circuit diagram of a drive control device for a brushless motor according to a third preferred embodiment of the present invention

Furthermore, in order to provide the voltage on the motor coil in a safe and reliable range, the drive control device of the present invention includes a voltage limit circuit 60, as shown in FIG. 3. The voltage limit circuit 60 includes a CMOS TN3, a triode Q2, a regulator tube Z3 and a plurality of resistors R13, R14, R15. The CMOS TN3 is chosen from the group of 2SK2996, RDX120N60 and RDX100N60 power MOSFETs. The triodes Q2 is chosen from the group of UMT2222A, SST2222A and MMST2222A triodes. The regulator tube Z3 is chosen from the group of 1N5955B and 1N5956B regulator diodes. The D and S terminals of the CMOS TN3 are connected to the output of the rectifying-filtering circuit 10 and each of the inductors L1 and L2 of the motor coil in series, respectively. The G terminal of the CMOS TN3 connected with resistor R15 in series is connected to the collector of the triode Q2. The resistor R13 is connected between the D and G terminals of the CMOS TN3 in parallel. The emitter of the triode Q2 is connected to ground. The base of the triode Q2 connected with regulator tube Z3 and the resistor R14 in series is connected the S terminal of the CMOS TN3.

The principle of the drive control device for the brushless motor of the present invention is as follows.

As shown in FIG. 1, an alternative current (AC) power is inputted through the transistors D1, D2, D3, D4 for bridging rectification and through the capacitor C1 for filtrating to obtain a direct current (DC) power. The DC power is directly provided to the inductors L1, L2 of the motor coil in a constant voltage. Moreover, the CMOS TN1, TN2 can be protected to avoid voltage supplying to S and D terminals thereof over a permitted endurable value.

The resistors R1, R2 and the regulator tube Z1 constitute the voltage dropping and regulating circuit. The resistors R1 and R2 are connected in parallel to be a divider. When the resistor R1 receives the voltage lower than a regulation voltage of the regulator tube Z1, the voltage V0 outputted to the drive control circuit is the dividing voltage of the resistor R2. Conversely, when the dividing voltage of the resistor R2 higher than the regulation value, according to the regulating characteristic of the regulator tube Z1, V0 will not exceed the regulation voltage.

The integrated chip U1 is a magnetic Hall sensor, which will be induced by the switch of N pole and S pole in the magnetic field. When the second pin of the integrated chip U1 has high level output, the fourth pin will have low level output, vice versa. It is impossible for two pins to have both high level or low level outputs. The output signal is compared and amplified by the integrated chip U2 to output by Output 1 and Output 2. The integrated chip U2 is mainly used for pre-driving. Alternatively, if Output 1 has high level output, Output 2 will have low level output, and if Output 1 has low level output, Output 2 will have high level output. When the high level output from Output 1 is inputted to G terminal of the CMOS TN1 and the low level output from Output 2, CMOS TN1 will open to drive inductor L1 and CMOS TN2 will close to stop inductor L2, respectively. Alternatively, when the high level output from Output 2 is inputted to G terminal of the CMOS TN 2 and the low level output from Output 1, CMOS TN2 will open to drive inductor L2 and CMOS TN1 will close to stop inductor L1, respectively.

As shown FIG. 2, the diodes D5, D6, the triode Q1, the resistors R11, R12, RA and the capacitor C5 constitute the current limit circuit 50. When the resistor RA detects a predetermined current limit, via the resistor R11 to base of the triode Q1, the triode Q1 will open. As such, two output pins of the integrated chip U1, via the diodes D5, D6, will reduce outputting voltage level to zero. Each G terminal of the CMOS TN1, TN2 receives zero voltage level so that the CMOS TN1, TN2 will close to stop both inductors L1, L2. Therefore, the current limit circuit 50 can provide the protection function to reduce the temperature of inductors L1, L2.

As shown in FIG. 3, the CMOS TN3, the triode Q2, the regulator tube Z3 and the resistors R13, R14, R15 constitute the voltage limit circuit 60. When the voltage is over a regulation limit of the regulator tube Z3, due to the breakdown characteristic of the diode, current passing via the regulator tube Z3 to the base of the triode Q2, the triode Q2 will open. As such, G terminal of the CMOS TN3 receive zero voltage level so that the CMOS TN3 will close to provide the over voltage protection. When the voltage becomes normal, no current passing the regulator tube Z3, the triode Q2 will close. That is, CMOS TN3 opens and the drive control device can work normally.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A drive control device for a brushless motor comprising:
   a rectifying circuit with an input connected to a power source and an output connected to one terminal of each of a first and a second inductors of the brushless motor;
   a regulating circuit with an input connected to the output of the rectifying circuit;
   a drive control circuit with an input connected to an output of the regulating circuit and an output connected to the other terminal of each of the first and the second inductor; and
   a protection circuit connected between the output of the rectifying circuit and ground,
   wherein the drive control circuit includes a first and a second integrated chips, a first and a second complementary metal oxide semiconductors (CMOS), a first, a second, a third, a fourth, a fifth and a sixth resistors and a first, a second and a third capacitors, the first resistor has one terminal connected to the output of the rectifying circuit and the other terminal connected to a first pin of the first integrated chip, the second resistor is connected between a third pin of the first integrated chip and the ground in series, the first integrated chip has a second and a fourth pins connected to two input pins of the second integrated chip, respectively, the second integrated chip has a Vcc pin connected to the output of the regulating circuit and a GND pin directly connected to the ground, the first capacitor is connected between a CT pin of the second integrated chip and the ground in series, the fourth resistor is connected between the first output pin of the second integrated chip and a gate of the first CMOS in series, the fifth resistor and the second capacitor connected in parallel are connected between the gate of the first CMOS and ground in series, a drain of the first CMOS is connected to the other terminal of the first inductor, and a source of the first CMOS is connected to the ground, the third resistor is connected between the second output pin of the second integrated chip and a gate of the second CMOS in series, the sixth resistor and the first capacitor connected in parallel are connected between the gate of the second CMOS and the ground in series, a drain of the second CMOS is connected to the other terminal of the second inductor, and a source of the second CMOS is connected to the ground.

2. The drive control device as claimed in claim 1, wherein the first integrated chip is chosen from a group of HW104A, SH12A and HW101 Hall sensors.

3. The drive control device as claimed in claim 1, wherein the second integrated chip is chosen from a group of BA6406, PT308F-B, and AP1307 drive integrated circuits (ICs).

4. The drive control device as claimed in claim 1, wherein the first or the second CMOS is chosen from a group of 2SK2996, RDX120N60 and RDX100N60 power metal oxide semiconductor field effect transistors (MOSFETs).

5. The drive control device as claimed in claim 1, further comprising a current limit circuit including a first and a second diodes, a triode, a seventh, a eighth and a ninth resistors and a capacitor.

6. A drive control device for a brushless motor comprising:
   a rectifying circuit with an input connected to a power source and an output connected to one terminal of each of a first and a second inductors of the brushless motor;
   a regulating circuit with an input connected to the output of the rectifying circuit;
   a drive control circuit with an input connected to an output of the regulating circuit and an output connected to the other terminal of each of the first and the second inductor;
   a protection circuit connected between the output of the rectifying circuit and ground; and
   a current limit circuit including a first and a second diodes, a triode, a first, a second and a third resistors and a capacitor.

7. The drive control device as claimed in claim 6, wherein the first or the second diode is chosen from a group of 1 N4148, 1N4448 and RLS4148 regulator diodes.

8. The drive control device as claimed in claim 6, wherein the triode is chosen from a group of UMT2222A, SST2222A and MMST2222A triodes.

9. A drive control device for a brushless motor comprising:
- a rectifying circuit with an input connected to a power source and an output connected to one terminal of each of a first and a second inductors of the brushless motor;
- a regulating circuit with an input connected to the output of the rectifying circuit;
- a drive control circuit with an input connected to an output of the regulating circuit and an output connected to the other terminal of each of the first and the second inductor;
- a protection circuit connected between the output of the rectifying circuit and ground; and
- a voltage limit circuit including a complementary metal oxide semiconductor (CMOS), a triode, a regulator tube and a first, a second and a third resistors.

10. The drive control device as claimed in claim 9, wherein a drain and a source of the CMOS are connected to the output of the rectifying circuit and each of the first and the second inductors in series, respectively, a gate of the CMOS connected with the third resistor in series is connected to a collector of the triode, the first resistor is connected between the drain and the gate the CMOS in parallel, an emitter of the triode is connected to the ground, a base of the triode connected with the regulator tube and the second resistor in series is connected the source terminal of the CMOS.

11. The drive control device as claimed in claim 9, wherein the CMOS is chosen from a group of 2SK2996, RDX120N60 and RDX100N60 power metal oxide semiconductor field effect transistors (MOSFETs).

12. The drive control device as claimed in claim 9, wherein the triodes is chosen from a group of UMT2222A, SST2222A and MMST2222A triodes.

13. The drive control device as claimed in claim 9, wherein the regulator tube is chosen from a group of 1N5955B and 1N5956B regulator diodes.

* * * * *